(12) United States Patent
Ozdyk et al.

(10) Patent No.: US 8,707,528 B2
(45) Date of Patent: Apr. 29, 2014

(54) UNIVERSAL MACHINE FOR THE SOFT MACHINING OF BEVEL GEARS AND CORRESPONDING METHOD

(75) Inventors: Klaus Ozdyk, Lüdenscheid (DE); Roger Kirsch, Karlsbad (DE); Elmar Hackenberger, Zürich (CH); Harald Lamsfuss, Wipperfürth (DE); Torsten König, Hohndorf (DE)

(73) Assignee: Klingelnberg GmbH, Hückeswagen (DE)

( * ) Notice: Subject to any disclaimer, the term of this patent is extended or adjusted under 35 U.S.C. 154(b) by 1309 days.

(21) Appl. No.: 11/996,754

(22) PCT Filed: Jul. 28, 2005

(86) PCT No.: PCT/EP2005/053679
§ 371 (c)(1),
(2), (4) Date: Apr. 8, 2008

(87) PCT Pub. No.: WO2007/012351
PCT Pub. Date: Feb. 1, 2007

(65) Prior Publication Data
US 2008/0213055 A1    Sep. 4, 2008

(51) Int. Cl.
| B23P 23/02 | (2006.01) |
| B23F 9/10 | (2006.01) |
| B23F 17/00 | (2006.01) |
| B23B 3/22 | (2006.01) |
| B23B 5/00 | (2006.01) |
| B23Q 39/02 | (2006.01) |
| B23F 5/20 | (2006.01) |
| B23B 3/16 | (2006.01) |

(52) U.S. Cl.
CPC . *B23P 23/02* (2013.01); *B23F 9/10* (2013.01); *B23F 5/205* (2013.01); *B23B 3/22* (2013.01); *B23B 3/162* (2013.01); *B23Q 39/02* (2013.01); *B23Q 39/021* (2013.01); *B23Q 39/024* (2013.01)
USPC ............... 29/27 C; 29/27 A; 29/56.5; 29/36; 409/40; 409/53; 409/27; 409/57; 82/121

(58) Field of Classification Search
CPC ............ B23F 9/10; B23F 5/24; B23F 5/205; B23F 5/27; B23F 9/105; B23F 9/12; B23F 9/14; B23F 17/00; B23P 23/02; B23P 23/00; B23P 15/14; B23B 3/22; B23B 3/24; B23B 3/26; B23B 3/162; B23B 3/165; B23B 3/168; B23B 5/00; B23B 2270/56; B23Q 39/00; B23Q 39/02; B23Q 39/021; B23Q 39/024
USPC ........... 409/40, 54, 55, 13, 27–30, 43–45, 53, 409/57, 25; 29/56.5, 893.3, 893.35, 893.36, 29/27 C, 27 R, 27 A, 36; 407/25; 82/120, 82/121, 118, 129
See application file for complete search history.

(56) References Cited

U.S. PATENT DOCUMENTS

| 906,189 | A | * | 12/1908 | Boisard | 409/13 |
| 4,102,583 | A | * | 7/1978 | Nelson | 407/25 |
| 5,885,199 | A |  | 3/1999 | Shao |  |
| 6,618,917 | B2 | * | 9/2003 | Sugiura et al. | 29/27 C |
| 6,640,677 | B2 | * | 11/2003 | Ueda et al. | 82/129 |
| 2010/0111628 | A1 | * | 5/2010 | Megens et al. | 409/26 |

FOREIGN PATENT DOCUMENTS

| DE | 24 25 555 A1 | 5/1974 |
| EP | 0 832 716 A2 | 1/1998 |
| EP | 1 018 387 A1 | 7/2000 |
| JP | 61 168420 | 7/1986 |

OTHER PUBLICATIONS

Suh et al., article titled "Sculptured Surface Machining of Spiral Bevel Gears with CNS Milling", from International Journal of Machine Tools & Manufacture, copyright 2001, pp. 833-850.*
International Search Report for PCT/EP2005/053679.

* cited by examiner

*Primary Examiner* — Erica E Cadugan
(74) *Attorney, Agent, or Firm* — McCormick, Paulding & Huber LLP

(57) ABSTRACT

The invention relates to a device for use in production of bevel gears. The device comprises a turning machine (22), with a working spindle (22.1) and a counter-holder (23), arranged co-axially to a rotational axis (B1) of the working spindle (22.1) for the coaxial tensioning of a workpiece blank (K1). A multi-functional tool holder (24) is provided, which may be displaced relative to the workpiece blank (K1) held in the turning machine (22) and comprises a tool base (25) mounted to rotate about an axis (B2). The tool base (25) is provided for fixing one or more tools. A tool housing (26) with milling head (27) is provided, the tool housing (26) being displaceable relative to the workpiece blank (K1) held in the turning machine (22) and the milling head (27) is mounted to rotate about a milling head axis (B3). A controller is provided for control of the movement processes, to subject the workpiece blank (K1) firstly to a turning process with a tool fixed to the tool base (25) and then a toothing machining with the milling head (27).

8 Claims, 3 Drawing Sheets

UNIVERSAL MACHINE FOR THE SOFT MACHINING OF BEVEL GEARS AND CORRESPONDING METHOD

CROSS REFERENCE TO RELATED APPLICATION

This application claims the benefit of PCT Application No. PCT/EP2005/053679, filed Jul. 28, 2005, the disclosure of which is herein incorporated by reference in its entirety.

BACKGROUND OF THE INVENTION

The present invention relates to apparatuses for the soft machining of bevel gears, especially apparatuses designed for dry machining. The invention also relates to a respective method.

There are various machines which are used in the production of bevel gears and similar gearwheels. There has been a desire for some time to automate the production. One solution that has made only limited headway is a machining center which is designed in such a way that a large number of production steps can be performed on one and the same machine. Such machines are not only very complex and therefore expensive, but also require a relatively large amount of work in preparatory setup (setup time). On the other hand, such machines that were developed with a view to high flexibility are rather suited for individual productions or very small series.

The European patent EP 0 832 716 B1 shows and describes a compact machine which is designed for turning and gear hobbing a workpiece, with said workpiece not having to be re-chucked or transferred. In other words, the workpiece sits on a main spindle after chucking and is machined there with different tools. It is regarded as a disadvantage that as a result of the arrangement of the different elements it is not designed to carry out dry machining since the removal of the hot chips is especially relevant in dry machining. Moreover, the freedom of movement is limited with respect to the workpiece as a result of the lateral arrangement of the two carriages with the tools. The shown machine is not suitable for machining bevel gears or the like, but is designed for machining cylinder gears.

SUMMARY OF THE INVENTION

The invention is based on the object of simplifying the production of bevel gears.

It is a further object of the invention to provide a respective apparatus which is inexpensive.

These objects are achieved in accordance with the invention by an apparatus (20) comprising:
- a turning machine (22) having a working spindle (22.1) and a counter-holder (23) arranged coaxially to a rotational axis (B1) of the working spindle (22.1) for coaxially clamping a workpiece blank (K1);
- a tool base (24) which is displaceable relative to the workpiece blank (K1) held in the turning machine (22) and comprises a multifunctional tool holder (25) mounted to rotate about an axis (B2) extending substantially parallel to the rotational axis (B1) of the working spindle (22.1), with the multifunctional tool holder (25) being configured for fastening at least one tool (25.1-25.4);
- a tool housing (26) displaceable relative to the workpiece blank (K1) held in the turning machine (22); characterized in that:
- the tool housing holds a milling head (27) rotatable about a milling head axis (B3) with a set of axially extending cutters chucked in the tool housing (26);
- the milling head (27) is mounted at an adjustable angle (W) respective to the rotational axis (B1) of the working spindle (22.1); and
- the milling head (27) is equipped with a set of cutters protruding from an axial end face thereof with respect to said milling head axis (B3), the tool housing (26) also being arranged to advance the milling head (27) towards the workpiece blank (K1) to machine the workpiece blank (K1),
- a CNC controller (28) for controlling different movement processes of the tool base (24) and the tool housing (26) in order to subject the workpiece blank (K1) firstly to a turning process with a tool fixed to the tool base (24) and then to a tooth machining process with the milling head (27) to produce a bevel gear from the workpiece blank (K1). These objectives are also achieved by a method for soft machining of bevel gears, comprising the following steps:

a) clamping of a workpiece blank (K1) on a first workpiece spindle (22.1) of a turning machine (22) which comprises a counter-holder (23) for coaxially clamping the workpiece blank (K1), which counter-holder is arranged coaxially to a rotational axis (B1) of the workpiece spindle (22.1);

b) performing a turning machining with a tool fastened to the tool base (24), with the turning machine (22) comprising the tool base (24) which is movable relative to the workpiece blank (K1) clamped in the turning machine (22) and comprising a multifunctional tool holder (25) being rotatably held about an axis (B2) which extends substantially parallel to the rotational axis of the first workpiece spindle (B1), with the multifunctional tool holder (25) being configured for fastening the tool;

c) performing gear-tooth forming with a milling head (27), with the turning machine (22) comprising a tool housing (26) for the milling head (27) and the tool housing (26) is movable relative to the workpiece blank (K1) clamped in the turning machine (22) and the milling head (27) is rotatably held about a machining head axis (B3) at an adjustable angle (W) respective to the rotational axis (B1) of the working spindle (22.1).

The apparatus in accordance with the invention is relatively inexpensive and can therefore be used in situations where complex and therefore often expensive machine tools are not economical. The method in accordance with the invention is especially designed for machining tooth flanks prior to a hardening process, i.e. in the soft state. The tools which are used must be chosen accordingly.

BRIEF DESCRIPTION OF THE DRAWINGS

Embodiments of the invention are described in closer detail by reference to the drawings, wherein.

DESCRIPTION OF THE PREFERRED EMBODIMENTS

Terms will be used in connection with the present description, which are also used in relevant publications and patents.

Notice shall be taken however that the use of such terms shall merely serve better understanding. The inventive idea and the scope of protection of the claims shall not be limited in their interpretation in any way by the specific choice of the terms. The invention can easily be transferred to other terminological systems and/or specialist fields. The terms shall apply analogously in other specialist fields.

In accordance with the invention, the machining of bevel gears is concerned. This term shall also include crown wheels and bevel pinions, according to definition. It also includes bevel gears without axial offset and bevel gears with axial offset, so-called hypoid bevel gears.

Figure 1:
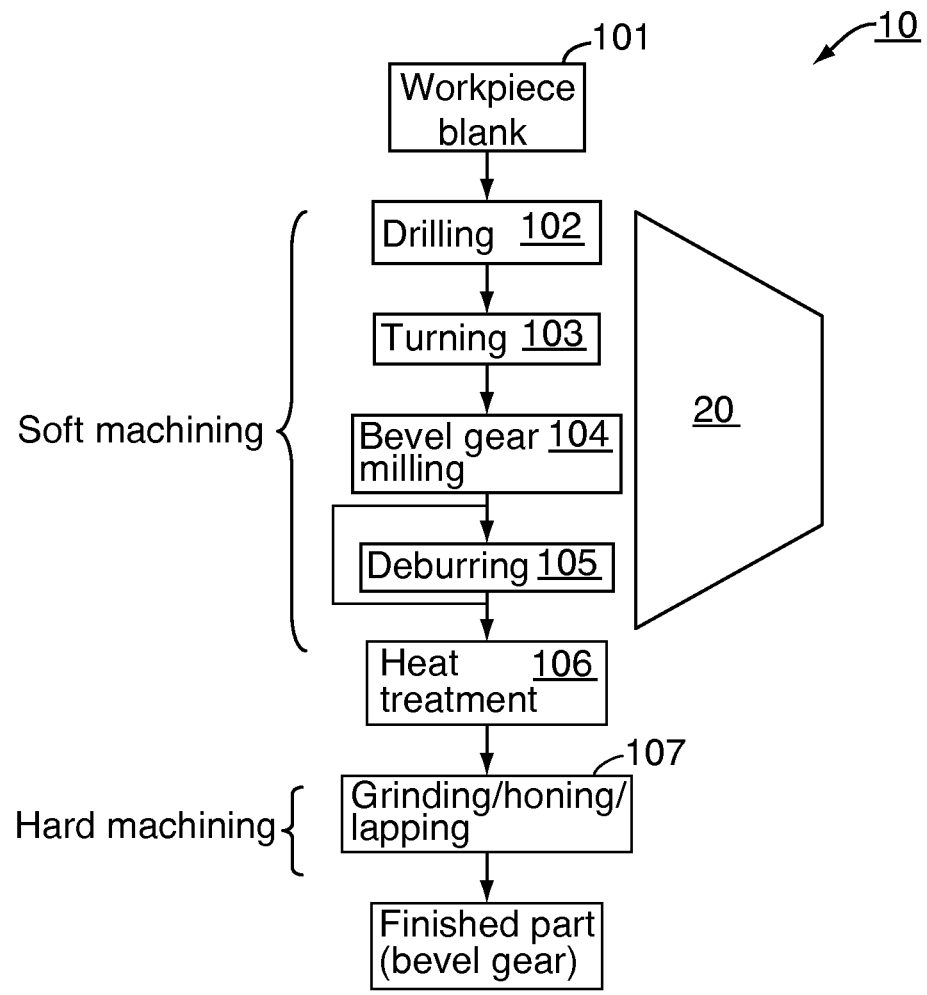
FIG. 1 shows a schematic view of the various machining steps in producing bevel gears.

FIG. 1 shows a schematic view of an exemplary process run 10. The invention can be used advantageously in the shown context. As was already mentioned, it concerns an example for machining a bevel gear. Based on a workpiece blank (box 101), the following soft machining steps are performed in the illustrated example. Based on a workpiece blank (box 101), the following soft machining steps are performed in the illustrated example. A (central) bore can be produced by drilling for example (box 102). The workpiece blank can then be machined by turning (box 103) with a lathe tool. These steps are referred to in this context as preform production or pre-machining. Other steps or alternative steps can be carried out within the scope of preform production. The workpiece is referred to as a gear blank at the end of preform production.

This is followed by the so-called gear-tooth forming. In accordance with the invention, preferably (dry) bevel gear milling (box 104) is used in order to produce teeth in the gear blank. This is followed by trimming as an optional step (box 105). The steps 102, 103 and 104 or the steps 102 to 105 can be carried out in accordance with the invention in an apparatus 20 in accordance with the invention.

This is typically followed by heat treatment (box 106) in order to harden the gear blank and by aftertreatment or finishing (box 107). The bevel gear is then finished.

Further details of the invention are described below by reference to a more detailed description of the individual method steps and by means of an embodiment.

The method in accordance with the invention for soft machining of bevel gears comprises the following steps. The reference numerals relate to FIG. 2. A workpiece blank K1 is clamped in a first working spindle 22.1 of a turning machine 22 which is part of the apparatus 20 in accordance with the invention. A first soft machining of the workpiece blank K1 is performed with one or several tools 25.1, 25.2, 25.3. The tool or tools 25.1, 25.2, 25.3 are clamped in a first multifunctional tool holder 25 of apparatus 20. This first soft machining can concern one or several of the following machining steps: drilling, turning, milling. The goal of this first soft machining is to produce a gear blank from the workpiece blank K1.

The gear-tooth forming is now also carried out in the same apparatus 20. This occurs as follows. A second soft machining of the gear blank is performed with a milling head 27 which is chucked on a tool housing 26. The goal of said second soft machining is to produce a gearing on the gear blank. Preferably, the second soft machining comprises the (dry) bevel gear milling of the gear blank by means of a milling head 27.

In order to perform said steps in the mentioned manner, the multifunctional tool holder 25 is located on the tool base 24 and the milling head 27 on the tool housing 26 in a horizontal plane relative to the main axis B1 of the turning machine 22. The tool base 24 is preferably located on the one side and the tool housing 26 on the other side next to axis B1.

Preferably, all machining steps can be carried out in a dry manner. In this case, however, it is necessary to configure and arrange the apparatus 20 accordingly, especially in order to enable the removal of the hot chips.

Figure 2:
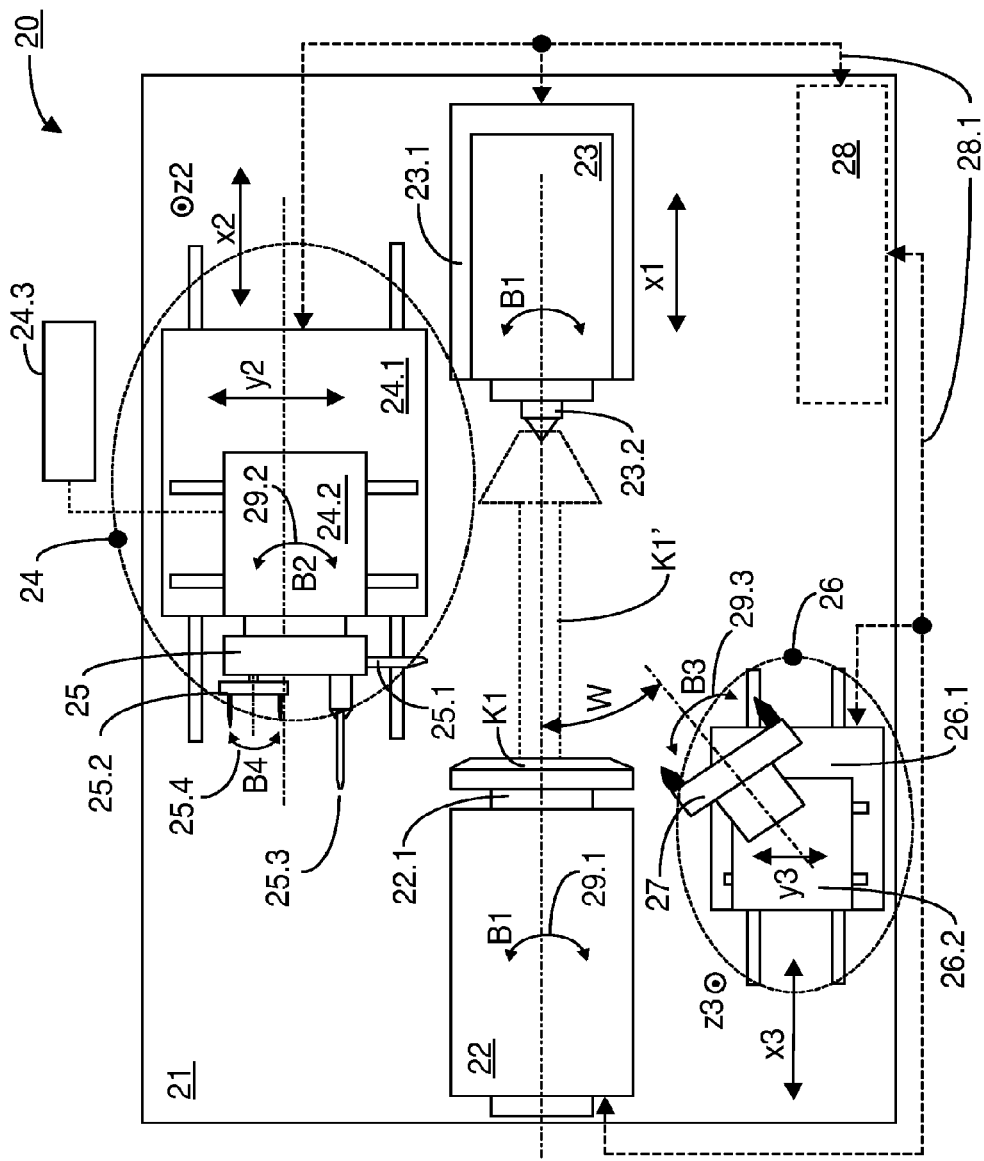
FIG. 2 shows a schematic view of a first apparatus for use in soft machining of bevel gears in accordance with the invention.

The apparatus 20 in accordance with the invention is shown in FIG. 2. The apparatus 20 is specially designed for use in soft machining of bevel gears and comprises a CNC-controlled turning machine 22 with a working spindle 22.1 for receiving the workpiece blank K1. The apparatus 20 comprises a tool base 24 with different tools 25.1 to 25.3 and a tool housing 26 for receiving the gearing tool (a milling head 27 for example) for gear-tooth forming the gear blank. A counter-holder 23 can also be provided.

In accordance with the invention, the apparatus 20 concerns a horizontally operating machining station on the basis of a turning machine in which the tool housing 26 with the milling head 27 is arranged to the side of the working spindle 22.1 with the gear blank during the gear-tooth forming. (It is also possible to provide a vertical configuration with a similar overall arrangement.)

In accordance with the invention, the turning machine 22 forms a functional unit in combination with the tool housing 26, in which the workpiece blank K1 is subjected to a first soft machining in order to be subjected to gear forming after the first soft machining as a gear blank by the milling head 27. The apparatus 20 has a CNC controller 28 which is indicated in FIG. 2. The CNC controller 28 is linked by control at least with the following parts of the system 22, 24, 25, 26, which is indicated in FIG. 2 by the arrows 28.1. This linkage can also be made via a bus or via a cable connection. It is also possible to use another kind of the interface, e.g. a wireless connection, in order to link the CNC controller 28 with the individual system parts 22, 24, 25, 26.

Further details of the apparatus 20 shown in FIG. 2 will be explained below. The turning machine 22 has a main rotational axis B1. The working spindle 22.1 can be rotated about said axis B1, as is indicated by the double arrow 29.1. Furthermore, the counter-holder 23 sits coaxially to the working spindle 22.1 on a carriage 23.1 and can be displaced in the longitudinal direction to the main rotational axis B1, as indicated by arrow x1. In addition, the tool base 24 has a rotational axis B2. The tool holder 25 can be rotated about said axis B2, as is indicated by the double arrow 29.2. In the illustrated embodiment, the tool base 24 sits on a carriage 24.1, 24.2 and can thus be displaced together with the tool 25.1, 25.2, 25.3 in the axes x2, y2. A drive 24.3 is connected with the carriages 24.1, 24.2 and the tool holder 25 to enable advancing various tools (25.1, 25.2, 25.3) with respect to the workpiece blank (K1) by rotation of the tool holder (25) about its axis (B2) extending substantially parallel to the rotational axis (B1) of the working spindle (22.1) and by translatory movements of the tool base (24).

The milling head 27 can rotate about axis B3, as indicated by the double arrow 29.3. Furthermore, the tool housing 26 sits on a carriage 26.1, 26.2 and can be displaced in different directions, as is indicated by arrows x3, y3.

In the illustrated embodiment, the working spindle 22.1 plus workpiece blank K1 and/or gear blank cannot be displaced in a translatory manner. The displacing capability parallel to the to the axis x1 is not necessary in a mandatory fashion because the tool 25.1, 25.2, 25.3 and the milling head 27 can be advanced in that the tool base 24 or the tool housing 26 are displaced parallel to the axis x1. A displacement of the turning machine 22 in the plane of projection perpendicular to the axis x1 is also not necessary in a mandatory manner because the tool base 24 and the tool housing 26 can be displaced in the y-direction y2, y3. The working spindle 22.1 can still be arranged on a carriage in order to gain further degrees of freedom.

The different axes concern numerically controlled axes. As a result, the individual movements can be controlled numerically by the CNC controller 28. Preferably, the controller 28 is arranged in such a way that all axes can be controlled numerically. Important is, that every single one of the movement sequences occurs in a coordinated manner. Said coordination is carried out by the CNC controller 28.

The apparatus 20 in accordance with the invention is thus special and thus stands out from other known approaches in that the individual machining stations 24, 26 are arranged horizontally. Moreover, the position of the different numerically controlled axes was chosen in such a way that there is the highest possible range for movement for machining the workpiece/blank. The following arrangement of the individual axes is especially preferred.

Tool base 24: Axis x2 extends parallel to the axis x1, with the two axis being offset against one another in that a relative movement parallel to the y2 direction is performed. In this way it is possible for example to machine a central bore in the workpiece blank K1 with a drill 25.3. The tool base 24 plus carriage 24.1, 24.2 is arranged adjacent to the working spindle 22.1 and it is possible to change the relative distance to one another in that relative displacements are made parallel to x2 and/or y2. Preferably, the two axes x1, x2 can also be offset against one another in the depth (perpendicular to the plane of projection). For this purpose, the carriage 24.1, 24.2 can be displaced parallel to an optional z2 axis.

Tool housing 26 with milling head 27: Axis x3 preferably extends parallel to the axis x1. The tool housing 26 plus carriage 26.1, 26.2 is also arranged horizontally to the working spindle 22.1 and the relative distance towards one another can be changed in that a relative displacement is performed parallel to the x3, y3 axes. The two axes x1, x3 can preferably be offset against another laterally (in the plane of projection). Carriage 26.1 can be displaced parallel to the y3 axis for this purpose. Preferably, the two axes x1, x3 can also be offset against each other in the depth (perpendicular to the plane of projection). Carriage 26.1, 26.2 can be displaced parallel to an optional z3 axis for this purpose.

It is also possible to associate the tool housing 26 with milling head 27 to another system of coordinates and to arrange the axes of such system of coordinates differently. In this case, the CNC controller 28 needs to take a coordinate transformation into account in order to enable the coordination of sequences of movements between the different coordinate systems.

During the gear-tooth forming, an angle W can be set and changed between the two axes B1 and B3, as shown in FIG. 2 where the angle is approximately 40°. An angular adjustability in the range from W1 to W2 is preferably possible. W is usually not set to a fixed value, but is changed during the milling.

According to an embodiment of the invention, the working spindle 22.1 for receiving the workpiece blank K1 comprises a clamping or grasping means in order to enable clamping of the workpiece blank/gear blank. An embodiment is especially preferable where the clamping or grasping means is designed for automatic mounting.

The tool base 24 of apparatus 20 is preferably equipped with a tool turret 25.2 which can receive several tools. An embodiment is especially preferable in which at least one of the tools which is located in the multifunctional tool head 25 or in the tool turret 25.2 can be driven individually. The tool turret 25.2 itself can be rotated about an axis B4, as indicated by the double arrow 25.4.

The tool base 24 can be used for turning, fluting, drilling, etc.

The multifunctional tool holder 25 shows in the illustrated embodiment several tool holders. Three tools 25.1 to 25.3 are present in the illustrated embodiment. The multifunctional tool holder 25 is preferably arranged in such a way that at least one of the tool holders is arranged as a spindle head in order to enable driving the respective tool individually. The tool 25.3 can concern a drill or a milling head which can be made to rotate about its longitudinal axis. The tools 25.1 and 25.2 can be tool turrets, lathe tools or deburring heads which are each fixedly clamped in a tool holder of the multifunctional tool holder 25.

The apparatus 20 can be modified and adjusted to the parameters accordingly.

An apparatus 20 is especially preferable which is characterized in such a way that the apparatus 20 comprises a CNC controller 28 which is designed in such a way that the turning machine 22, the tool base 24 and the tool holder 25 can be operated as a functional unit together with the tool housing 26. The advantage of the fact that there is only one CNC controller which is located in the turning lathe 21 or is designed for operation with the lathe 21 is that the apparatus 20 can thus be realized in a more cost-effective way. These savings in cost are mainly realized in such a way that bevel gear milling with the milling head 27 does not require a separate CNC controller 28. Moreover, the linkage of the axes is less complex and the coordination of the individual sequences of movements on apparatus 20 will become simpler.

Figure 3:
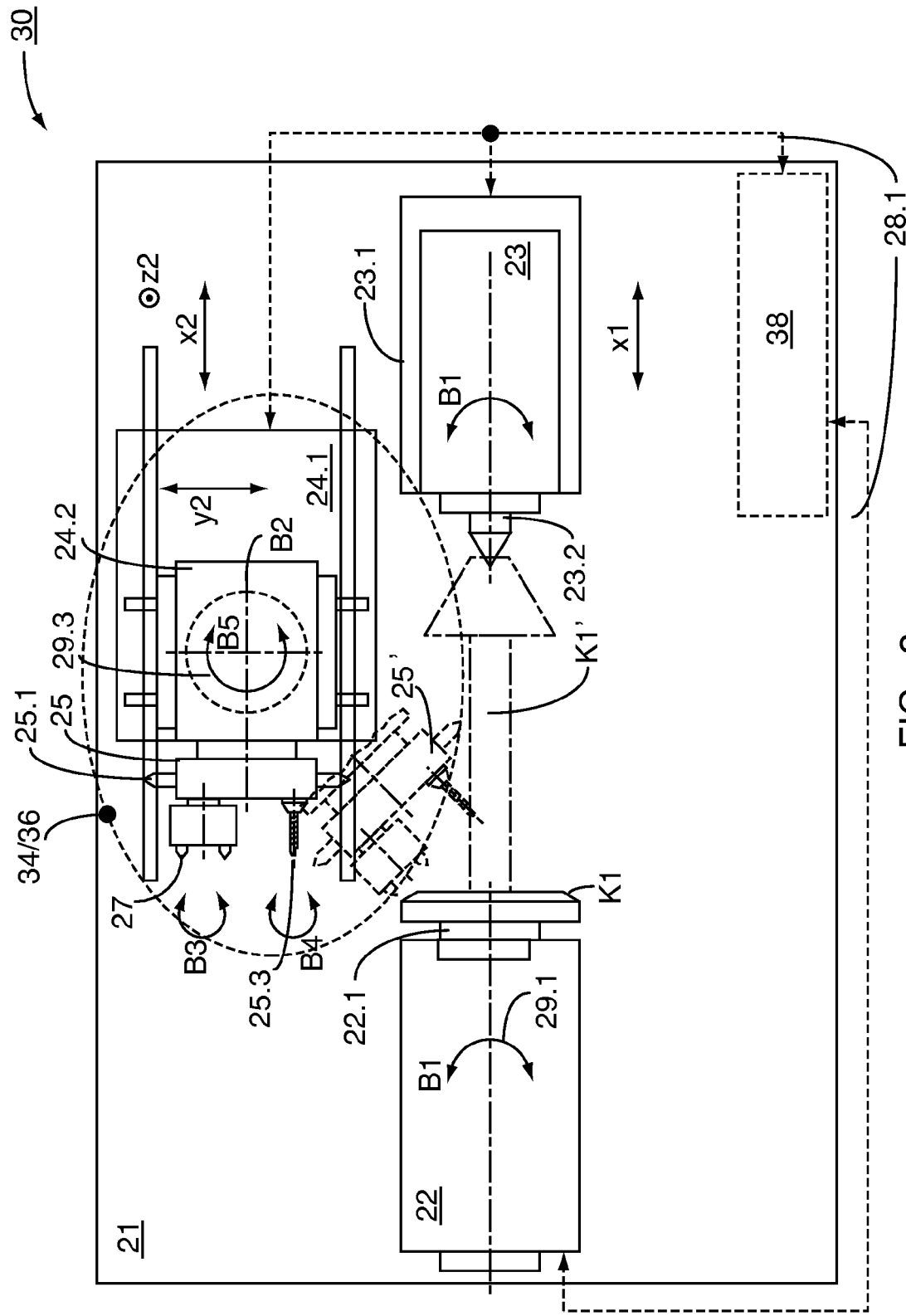
FIG. 3 shows a schematic view of a second apparatus for use in soft machining of bevel gears in accordance with the invention.

A further embodiment is shown in FIG. 3. This embodiment is based on the principle of the invention as described above. Insofar as useful, the same reference numerals will be used in FIG. 3.

FIG. 3 shows an apparatus 30 in which the multifunctional tool holder 34 also acts as a tool housing 36 for a milling head 27. The carriage 24.2 can be rotated about a perpendicular axis B5, as indicated by the double arrow 29.3. The milling head 27 can thus be turned to position 27' as shown schematically in FIG. 3. Bar cutters on the milling head 27 can then perform the milling of the gear blank K1. During this milling, both the milling head 27 is turned about its axis B3 as well as the gear blank about the axis B2. During machining by turning, which precedes milling for example, one of the other tools 25.1 or 25.3 can be used. Control is carried out by a CNC controller 38 which is provided with a different configuration than the controller 28 in FIG. 2 due to the slightly different arrangement of the axes and the integration of the milling head 27 in the tool holder 34.

An embodiment is especially preferable in which the tool housing 26, 36 or 46 is configured for dry milling of bevel gears or milling with minimal quantities of lubricant (MQL).

Tools made of high-duty steel, hard metal, ceramics or cermet (combination of metal and ceramics) with a respectively suitable hard solid coating are used according to the invention for gear-tooth machining by bevel gear mills depending on the hardness of the tool.

It is regarded as an advantage of the present invention that a workpiece, without having to be re-chucked, can be machined from the blank to the finished bevel gear. It thus concerns a virtually very compact production line which through special measures can be realized in the smallest possible space and made available at affordable prices.

The invention claimed is:

1. An apparatus comprising:
   a turning machine (22) having a workpiece spindle (22.1) and a counter-holder (23) arranged coaxially to a rotational axis (B1) of the workpiece spindle (22.1) for coaxially clamping a workpiece blank (K1);

a tool base (24) which is displaceable relative to the workpiece blank (K1) held in the turning machine (22) and comprising a multifunctional tool holder (25) mounted to rotate about an axis (B2) extending substantially parallel to the rotational axis of the workpiece spindle (B1), wherein the multifunctional tool holder (25) is configured for fastening at least one tool and subjecting the workpiece blank (K1) to a turning process;

a tool housing (26) displaceable relative to the workpiece blank (K1) held in the turning machine (22), with a milling head (27) chucked in the tool housing (26), wherein the milling head (27) is mounted to rotate about a milling head axis (B3) that is arranged at an angle (W) adjustable with respect to the rotational axis of the workpiece spindle (22.1), and the milling head (27) is equipped with a set of cutters protruding from an axial end face thereof with respect to said milling head axis (B3), the tool housing (26) also being arranged to advance the milling head (27) towards the workpiece blank (K1) to engage the set of cutters with the workpiece blank in order to perform toothing machining of the workpiece blank (K1); and a CNC controller configured for controlling different movement processes of the tool base (24), the multifunctional tool holder (25), the tool housing (26), and the workpiece spindle (22.1) in order to subject the workpiece blank (K1) firstly to a turning process with a tool fixed to the multifunctional tool holder (25) and then to the toothing machining with the milling head (27), such that the apparatus (20) is configured for producing a bevel gear from the workpiece blank (K1).

2. An apparatus (20) according to claim 1, characterized in that the tool housing (26) is arranged so as to be horizontally beside the workpiece spindle (22.1).

3. An apparatus (20) according to claim 1, characterized in that the milling head (27) can be advanced with respect to the workpiece blank (K1) perpendicular to the rotational axis (B1) of the workpiece spindle (22.1).

4. An apparatus (20) according to claim 1, characterized in that the tool base (24) has a drive (24.3) in order to enable advancing various tools (25.1, 25.2, 25.3) with respect to the workpiece blank (K1) by rotation of the multifunctional tool holder (25) about its axis (B2) extending substantially parallel to the rotational axis (B1) of the workpiece spindle (22.1) and by translatory movements of the tool base (24).

5. An apparatus (20) according to claim 1, characterized in that the apparatus is controllable by the controller (28) in such a way that said turning process is a soft machining of the workpiece blank (K1) with at least one tool (25.1-25.4) of the multifunctional tool holder (25) to form a gear blank (K1) and said toothing machining is a gear-tooth forming of the gear blank (K1) with the milling head (27).

6. An apparatus according to claim 5, wherein the gear-tooth forming occurs without a coolant or lubricant.

7. An apparatus (20) according to claim 1, characterized in that the rotatable multifunctional tool holder (25) holds a tool turret (25.2).

8. An apparatus according to claim 1, wherein the tool housing and the multifunctional tool holder are mounted on opposite sides of the workpiece spindle.

\* \* \* \* \*